Nov. 17, 1964 C. B. SLACK 3,157,873

VOLTAGE-TO-DIGITAL CONVERTER

Filed Feb. 21, 1962 6 Sheets-Sheet 1

INVENTOR
CHARLES B. SLACK
BY [signature]
ATTY.

Nov. 17, 1964 C. B. SLACK 3,157,873

VOLTAGE-TO-DIGITAL CONVERTER

Filed Feb. 21, 1962 6 Sheets-Sheet 2

Nov. 17, 1964 C. B. SLACK 3,157,873

VOLTAGE-TO-DIGITAL CONVERTER

Filed Feb. 21, 1962 6 Sheets-Sheet 3

Nov. 17, 1964 C. B. SLACK 3,157,873

VOLTAGE-TO-DIGITAL CONVERTER

Filed Feb. 21, 1962 6 Sheets-Sheet 4

FIG. 4 CHOPPER -14-AND-15- COMPARATOR AMP.-18-

Nov. 17, 1964 C. B. SLACK 3,157,873

VOLTAGE-TO-DIGITAL CONVERTER

Filed Feb. 21, 1962 6 Sheets-Sheet 5

3,157,873
VOLTAGE-TO-DIGITAL CONVERTER

Charles B. Slack, Glendale, Calif., assignor to General Precision, Inc., a corporation of Delaware
Filed Feb. 21, 1962, Ser. No. 174,894
14 Claims. (Cl. 340—347)

The present invention relates to systems and apparatus for converting analog voltages into digital representations; and it relates more particularly to an improved high speed and highly accurate analog-to-digital converter system of the "successive approximations" or "put-and-take" type, for use, for example, with high speed digital handling equipment such as high speed digital computers.

Analog-to-digital converter systems serve to digitize and so convert instantaneous analog voltages into signals representative of corresponding multi-digit binary numbers. In general, the usual "successive approximations" analog-to-digital converter system includes a register containing a plurality of flip-flops and associated logic and switching circuitry. The logic circuitry responds to an applied analog voltage and to a feedback reference voltage to set the flip-flops in the register to a configuration representative of the instantaneous value of the applied analog voltage. The settings of the flip-flops in the register can then be sensed in usual parallel or serial manner to derive signals representative of the multi-digit binary number equivalents of the applied analog voltages.

There are in general several different types of analog-to-digital converter systems known to the prior art. One type, for example, uses a pulse-width modulator which develops a gate pulse having a width corresponding to the amplitude of the applied analog voltage. The apparatus also includes a pulse generator and a counter. The width of the gate pulse determines the number of pulses to be passed from the pulse generator to the counter, and the counter provides a configuration corresponding to the equivalent multi-digit binary number.

In another type of analog-to-digital converter system, the amplitude of the analog voltage is first compared with a reference voltage representing the highest digit of the equivalent multi-digit number. If the analog voltage is greater than the reference voltage, a "1" is recorded in the highest digit position, and the reference voltage is subtracted from the analog voltage. The remainder is then compared with a reference voltage representing the next digit of the multi-digit binary number, and so on. If the analog voltage is smaller than the reference voltage in the highest digit position, a "0" is recorded, and the analog voltage is compared with the reference voltage representing the next digit, and so on. The above described procedure is continued from digit to digit.

The system of the present invention is predicated on the operating principles of a general type of analog-digital converter system different from those discussed above. This latter general type of analog-to-digital system, as noted above, is the "successive approximations" system. This latter system measures the amplitude of the analog input voltage, and it produces corresponding digital signals directly and without any need for intermediate counting or arithmetic steps.

In the general type of system with which the present invention is concerned, a digital number is stored in a register containing a plurality of flip-flops corresponding in number to the desired number of binary digits in the digital result. The digital number in the register is converted into a reference feedback voltage ($V_{FB}$) which is compared with the analog input voltage ($V_{IN}$). The result of the comparison indicates the sense of the difference between the two voltages. The number stored in the register is then changed, by changing the settings of the flip-flops in the register, in a digit-by-digit sequence from the most significant to the least significant digit, until the difference between the analog input voltage and the reference voltage is reduced essentially to zero.

For example, in one manner of operation of this latter type of system, the most significant digit flip-flop in the register is set to "1," and the other flip-flops are set to "0." As a result, the reference feedback voltage ($V_{FB}$) assumes a magnitude corresponding to the most significant digit. The difference produced as a result of the comparison between the analog input voltage ($V_{IN}$) and the reference feedback voltage ($V_{FB}$) indicates, therefore, whether or not the analog input voltage voltage is larger or smaller than the reference voltage.

If as a result of the above comparison, the analog input voltage is indicated as larger than the reference feedback voltage, the most significant digit flip-flop is left at "1," otherwise, the most significant digit flip-flop is set to "0." The remaining flip-flops in the register are then set to the "1" state in succession, and the above-described comparisons are successively made. In each instance, when the result of the comparison shows that the analog input voltage is larger than the reference feedback voltage, the particular corresponding flip-flop is left in the "1" state, otherwise it is reset to the "0" state.

More specifically, the "successive approximations" converter system described above utilizes an automatic null-seeking circuit which measures the difference between the analog input voltage ($V_{IN}$) and a comparison reference feedback ($V_{FB}$). If the resulting difference voltage exceeds that value which represents the least significant digit, the comparison reference feedback voltage is made to change automatically in a direction to reduce the difference voltage towards zero.

This change in the reference feedback voltage is achieved by switching precision resistance elements into and out of a ladder network in a digital-analog voltage converter. This resistance switching is accomplished by a series of gated flip-flops in the above-mentioned register, the gating of the flip-flops taking place in a logically programmed sequence. The resulting configuration of the flip-flops in the register when the "null" has been achieved represents the corresponding digital value of the analog input voltage.

A general object of the present invention, therefore, is to provide an improved high speed and yet extremely accurate analog voltage-to-digital converter system of the "successive approximations" type described briefly in the preceding paragraphs.

Yet another object of the invention is to provide such an improved analog-to-digital converter system which is relatively simple in its construction and operation.

A still further object is to provide such an improved analog voltage-to-digital converter system which incorporates improved and unique logic and control circuitry.

A still further object is to provide such an improved analog-to-digital converter system which is capable in one embodiment of accepting positive or negative analog voltages and of providing the equivalent digital values including a representation of the sign of the resulting digital values.

A feature of the invention is the provision, in the embodiment to be described, of circuitry for converting the above-mentioned difference voltage into a pulsating signal and for amplifying the same in an alternating current amplifier for high precision and accuracy in the operation of the system.

Another feature is the provision of a unique system and circuitry for producing sequence control gate signals for use in the analog-to-digital converter system of the invention.

A further feature is the provision of unique and improved logic switching circuitry for selectively connecting the precision resistance elements referred to above in and out of the active circuit of the system of the invention.

The above and other features, objects and advantages of the invention will become evident from a consideration of the following detailed description when taken in conjunction with the accompanying drawings, in which.

Figure 1:
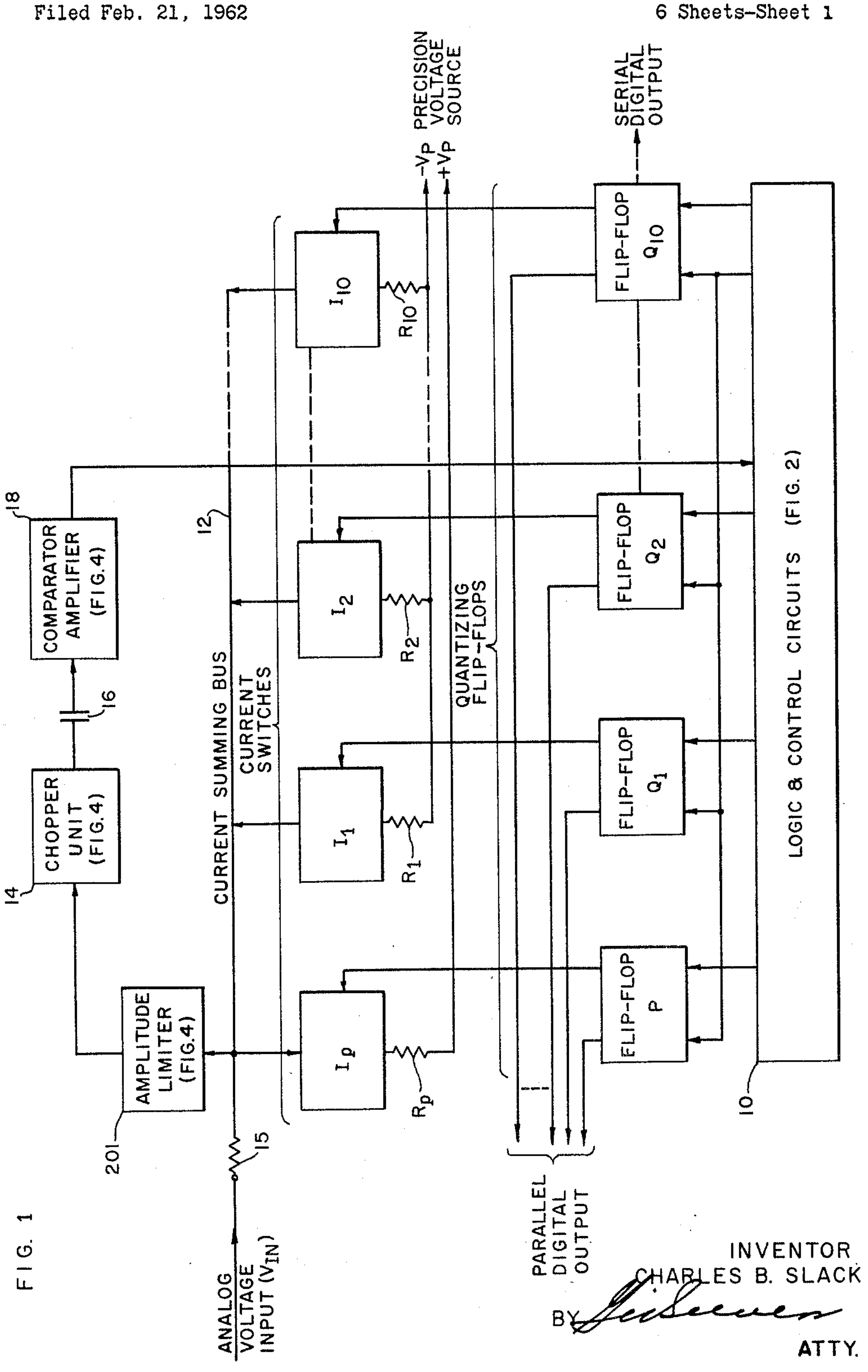
FIGURE 1 is a schematic block diagram of the analog voltage-to-digital converter system representative of one embodiment of the invention.
Figure 4:
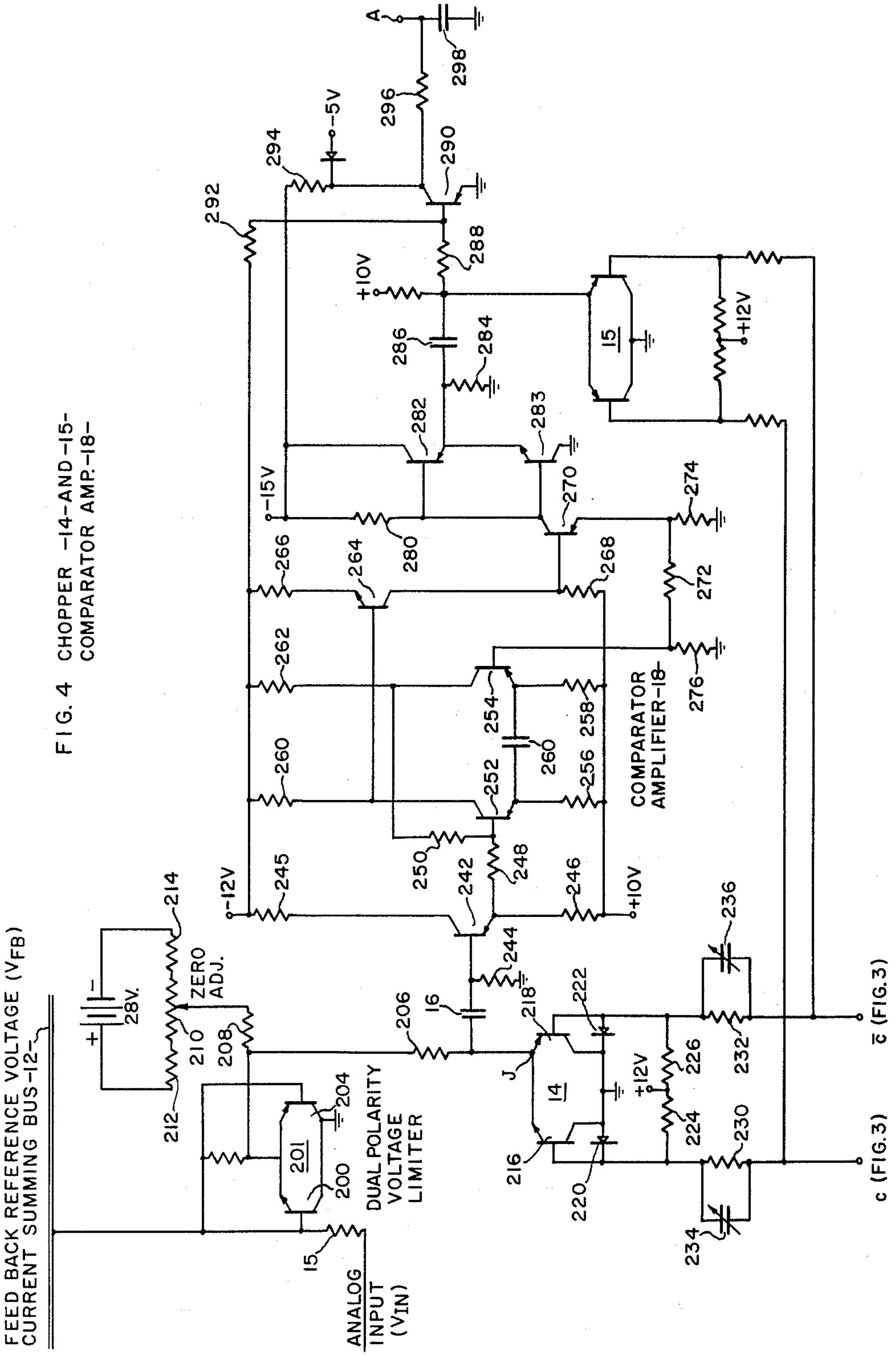
Figure 5:
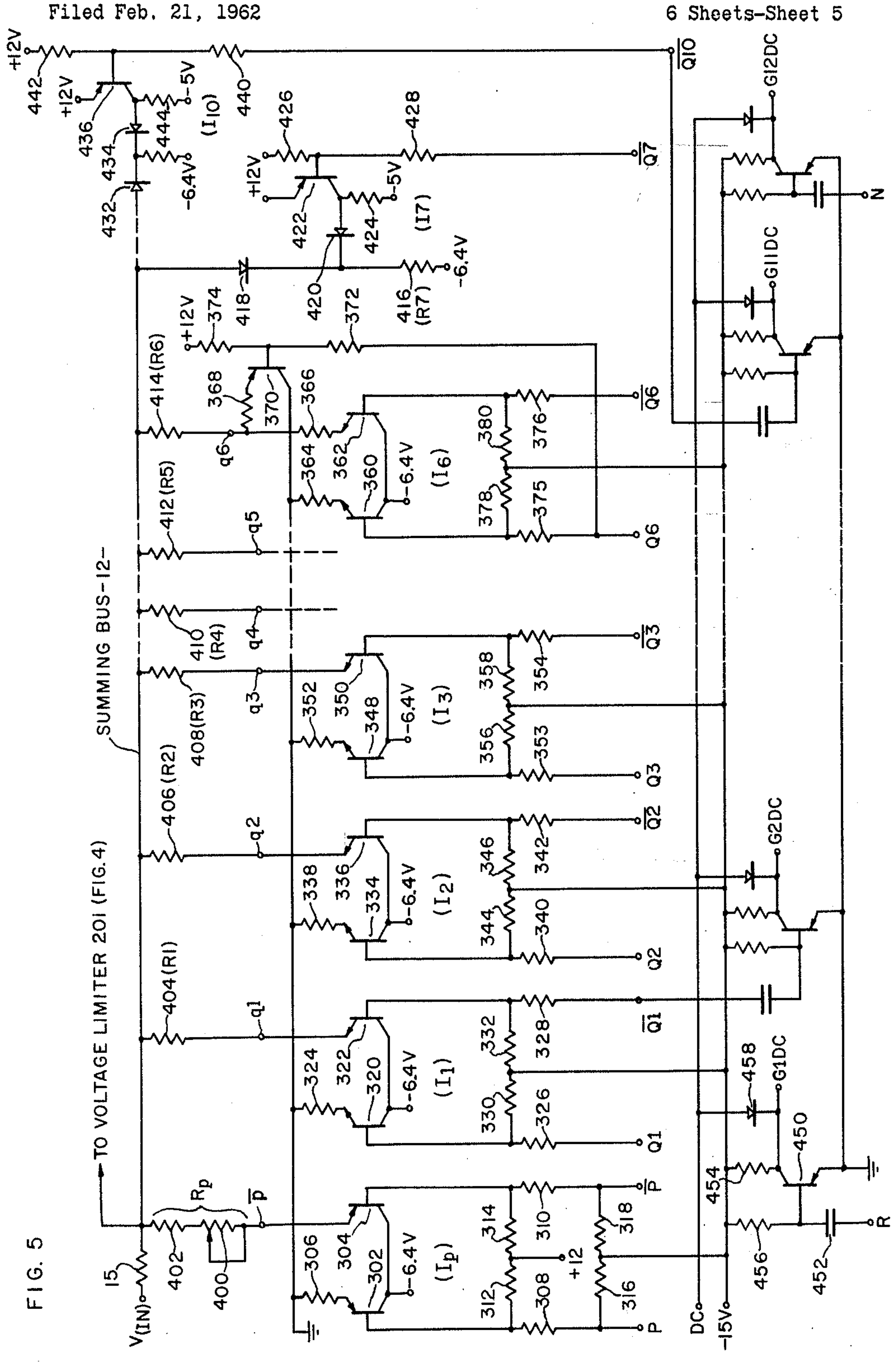
Figure 6:
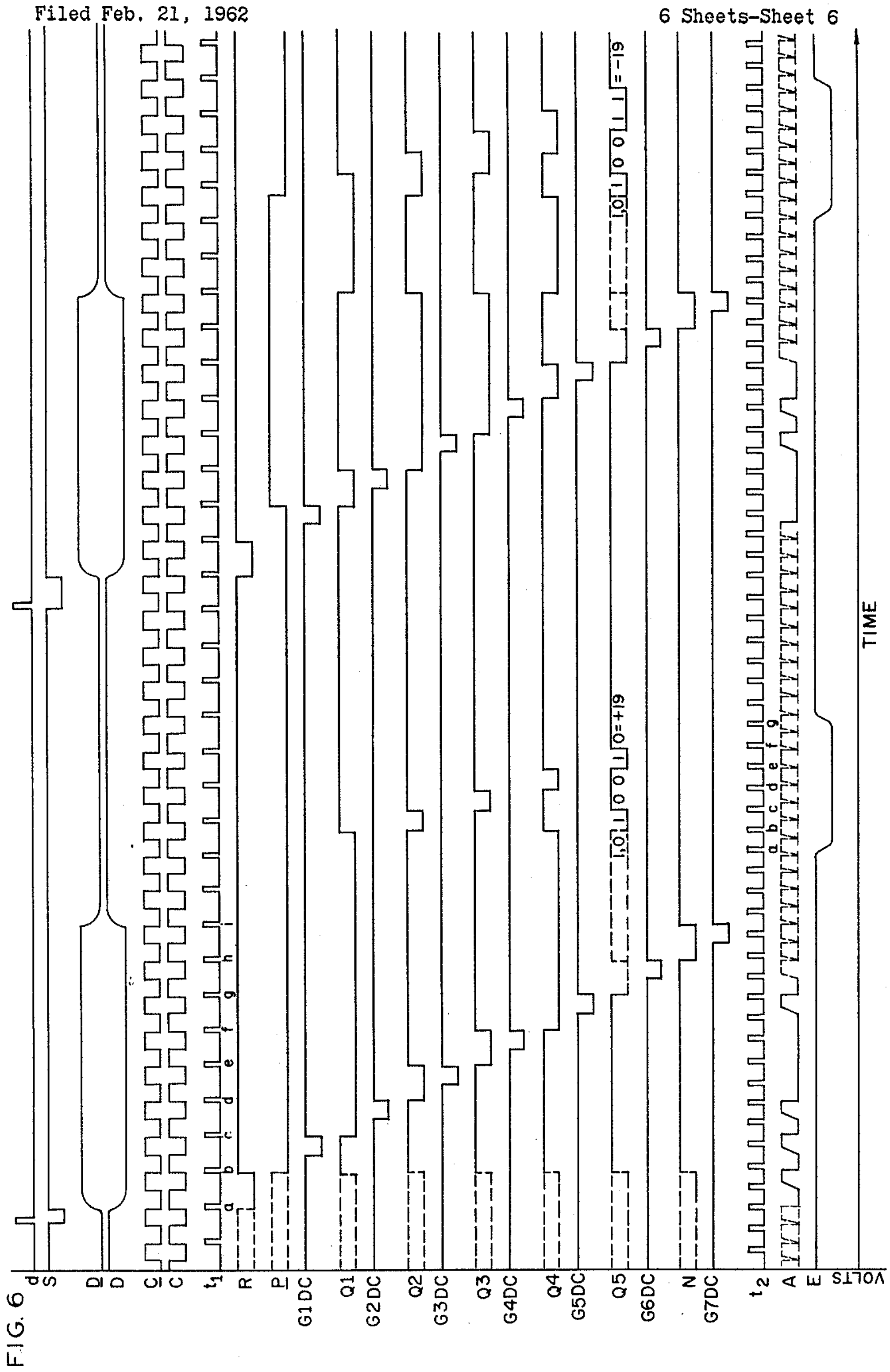

FIGURE 4 is a circuit diagram of certain of the components included in the system of FIGURE 1; and FIGURE 5 is a diagram of a switching circuit, a summing network and associated control circuitry, and of logic circuit for producing certain sequence control gate signals; all these circuits being included in the system of FIGURE 1; and FIGURE 6 is a series of curves and waveforms useful in describing the operation of the converter system of FIGURE 1.

In order to achieve, for example, 0.1% digital accuracy in the analog-digital converter system of the invention, it is necessary for ten binary decisions to be made. Also, when the analog input voltage is bipolar, as in the case of the embodiment to be described, an additional polarity decision must be made.

Each binary decision, in the operation of the system to be described, consists in switching a precision resistance element into a comparator decoding circuit. This is achieved by setting a flip-flop corresponding thereto to a particular state, and then either leaving the resistance element in the circuit by leaving the particular flip-flop in its particular state, or by resetting the flip-flop to its other state to remove the resistance element from the circuit. The decision depends upon (1) whether or not the unbalance between the analog input voltage and the comparison reference voltage exceeds a voltage representative of the least significant digit of the digitized result, and (2) the direction of the unbalance.

The block diagram of FIGURE 1 illustrates schematically a successive approximations type of analog voltage-to-digital converter system which incorporates the concepts of the present invention.

The system of FIGURE 1 includes a register containing a plurality of digitizing flip-flops designated, for example Q1–Q10, and a polarity flip-flop designated P. The polarity flip-flop P is set true only when the analog input voltage is negative. The flip-flops Q1–Q10 are the digitizing flip-flops, as noted, and their number is determined by the number of digits desired in the digitized result. The flip-flops Q1–Q10, P are controlled by approximate logic and control circuits which are represented in FIGURE 1 by the block 10, and which are described in more detail in conjunction with FIGURE 2.

The system of FIGURE 1 also includes a plurality of precision resistance elements $R_p$, and R1–R10. These resistance elements are controllably and selectively switched in and out of circuit by corresponding current switches $I_p$, and I1–I10. These switches, in turn, are respectively controlled by the flip-flops P and Q1–Q10. The precision resistance elements R1–R10 are connected to the negative terminal of a precision voltage source $V_p$, and the precision resistance element $R_p$ is connected to the positive terminal of that source. The current switches $I_p$, and I1–I10, are connected to a current summing bus 12. The analog input voltage ($V_{IN}$) to be measured is applied to a resistance element 15 which, in turn, is connected to the current summing bus 12. The polarity flip-flop P, and its associated elements $I_p$ and $R_p$ serve to maintain the potential of the bus 12 in the positive range when the input voltage ($V_{IN}$) is negative, so that negative input voltages may be measured in essentially the same manner as positive input voltages. The resistance element 15 may be variable, if so desired, to serve as a range control.

The current summing bus 12 is connected through an amplitude limiter 201, to a chopper unit 14 to be described in more detail in conjunction with FIGURE 4. The chopper unit 14 is coupled through a coupling capacitor 16 to a comparator amplifier 18. The comparator amplifier 18 will also be described in more detail in conjunction with FIGURE 4. The output of the comparator amplifier 18 is coupled back to the logic and control circuits, as designated by the block 10 in FIGURE 1. The output of the comparator amplifier has a first, or true, valuue (for example, −6 volts) when the reference feedback voltage ($V_{FB}$) is greater than the analog input voltage ($V_{IN}$); and it has a second, or false, value (for example, 0 volts) when the feedback voltage is less than the analog input voltage.

In a manner to be described in detail, the flip-flops Q1–Q10, P are initially reset false at the beginning of each digitizing operation. The analog input voltage ($V_{IN}$) is then introduced through the resistor 14 to the current summing bus 12. The polarity of the incoming voltage is sensed by the polarity flip-flop P, and that flip-flop is set true if the incoming voltage is negative. The setting of the flip-flop P to its true state causes the current switch $I_P$ to become conductive, so that the resistance element $R_P$ is connected into the current summing network; otherwise, the resistance element $R_P$ is disconnected from the network The above-mentioned action of the flip-flop P causes the potential of the current summing bus 12 to be maintained in a positive range when the input voltage ($V_{IN}$) is negative, and causes the potential of the current summing bus 12 to be maintained in a negative range when the input voltage ($V_{IN}$) is positive.

At the first digit time of the digitizing operation the flip-flop Q1 is set true. This flip-flop represents the most significant digit. The setting of the flip-flop Q1 to its true state causes the current switch $I_1$ to switch the precision resistance element $R_1$ into the summing network. The resulting reference feedback voltage ($V_{FB}$) is compared with the analog input voltage ($V_{IN}$) in the current summing bus 12 network. The voltage difference between the two is converted to a pulsating signal in the chopper unit 14. The resulting pulsating signal is amplified by the comparator amplifier 18.

If the analog input voltage ($V_{IN}$) is greater than the resulting first reference feedback voltage ($V_{FB}$), the comparator amplifier is caused to produce a "false" output, and the flip-flop Q1 remains in its true state. On the other hand, if the first reference feedback voltage ($V_{FB}$) is greater than the analog input voltage ($V_{IN}$), a "true" output is derived from the comparator amplifier 18. This "true" output is applied to the logic and control circuits 10 to return the flip-flop Q1 to its false state.

The above-mentioned operation is continued from flip-flop to flip-flop from the most significant digit to the least. In each instance, whenever the comparator amplifier 18 indicates by a "false" output that the total reference feedback voltage ($V_{FB}$) is less than the input analog voltage ($V_{IN}$) for positive input voltages, the corresponding flip-flop is left in its true state, otherwise the comparator amplifier 18 produces a "true" output, and the corresponding flip-flop is returned to its false state.

It can be shown mathematically that when the input voltage ($V_{IN}$) is negative, and when the polarity flip-flop P has been set true as a result thereof, the resulting digitizing operation of the system of the invention produces a digital output which represents the negative input voltage in complementary form. For that reason, the logic and control circuits represented by the block 10 include a decomplementing circuit. This circuit, as will be described, enables the setting of the digitizing flip-flops Q1–Q10 to be reversed for complementing purposes, when the setting of the flip-flop P to its true state represents the presence of a negative input voltage.

The setting of the digitizing flip-flops Q1–Q10 represents the value of the multi-digital binary number corresponding to the particular analog input voltage, and the setting of the flip-flop P represents the sign of the binary number. The number contained in these flip-flops may be shifted out serially, in accordance with usual shift register techniques, for utilization by the associated computer, output printer, or other appropriate apparatus. Conversely, the number contained in the digitizing flip-flops may be read out by a parallel type of output circuitry.

Figure 2:
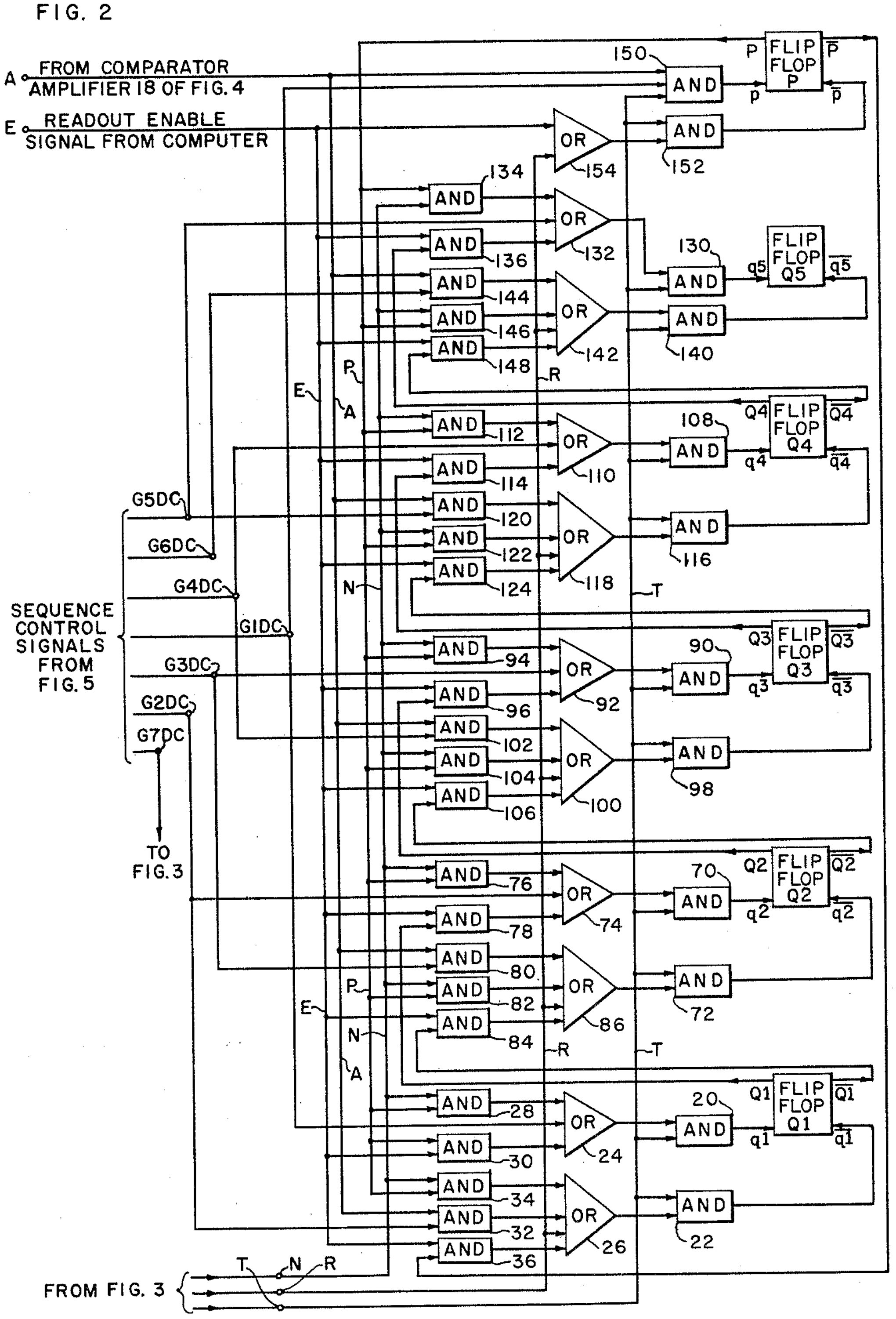
FIGURE 2 is a block diagram of the flip-flops included in a register in the system of FIGURE 1 and of the logic components and circuitry associated with the flip-flops.

The logic diagram of FIGURE 2 includes the digitizing flip-flops Q1–Q10, the polarity flip-flop P, and the logic associated with these flip-flops. The diagram of FIGURE 2 also shows further logic and control circuitry which is included in the block 10 of FIGURE 1. It will be observed that five only (Q1–Q5) of the digitizing flip-flops have been illustrated in FIGURE 2, this being for purposes of simplicity and to avoid needless repetition.

As illustrated in FIGURE 2, an "and" gate 20 is connected to the true input terminal of the digitizing flip-flop Q1, and an "and" gate 22 is connected to the false input terminal of that flip-flop. An "or" gate 24 is connected to the "and" gate 20, and an "or" gate 26 is connected to the "and" gate 22. A pair of "and" gates 28 and 30 is connected to the "or" gate 25; and three "and" gates 32, 34 and 36 are connected to the "or" gate 26.

A series of clock pulses T are applied to the "and" gates 20 and 22, these pulses being derived from an "or" gate 38. A pair of "and" gates 40 and 42 is connected to the "or" gate 38.

Figure 3:
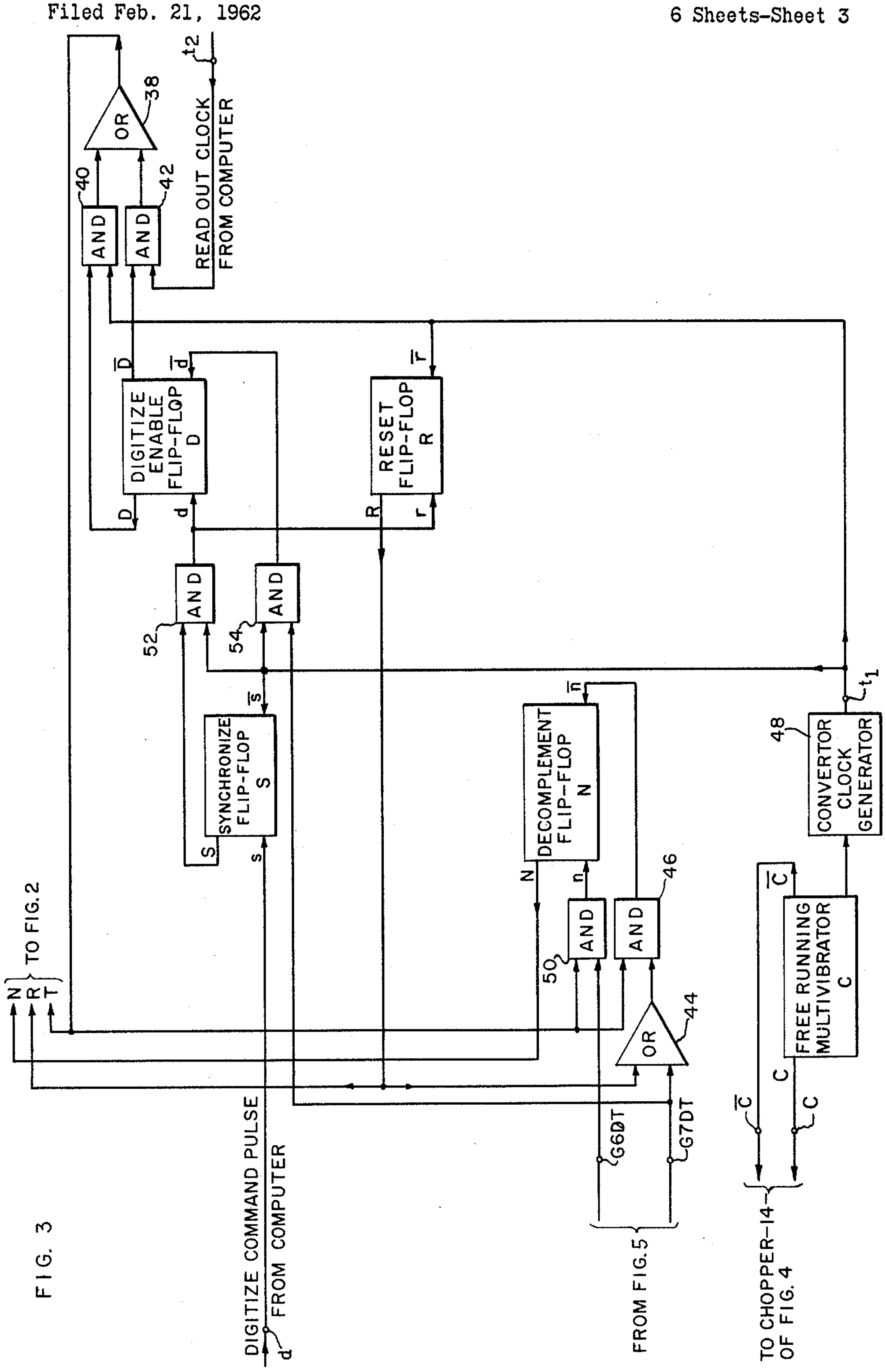
FIGURE 3 is a block diagram of further logic included in the system of FIGURE 1.

The system of FIGURE 3 includes a "digitize-enable" flip-flop D which is set true throughout the digitizing operation of the system. The true output terminal of the flip-flop D is connected to the "and" gate 40, and the false output terminal of the flip-flop is connected to the "and" gate 42.

The system also includes a reset flip-flop R. The true output terminal of the reset flip-flop R is connected to the "or" gate 26 and to an "or" gate 44. The "or" gate 44 is connected to an "and" gate 46 which, in turn, is connected to the false input terminal of a decomplementing flip-flop N. The true output terminal of the flip-flop N is connected to the "and" gate 34.

A plurality of sequence control gate signals, derived from the control circuit of FIGURE 5, and designated G1DC–G7DC are introduced to the correspondingly identified input terminals of the circuit of FIGURE 2. These sequence control gate signals occur respectively at successive digit times during the digitizing operation of the system, as will be described.

The system of FIGURE 3 also includes a converter clock generator 48, and this generator develops the converter clock pulses $t_1$ which clock the flip-flops during the digitizing operation. The sequence control gate signals G1DC–G7DC, when introduced to the circuit of FIGURE 2, gate in successive ones of the converter clock pulses $t_1$, as will be described. A free running multivibrator C is included in the system of FIGURE 3. This multi-ivbrator controls the operation of the converter clock generator 48, and it also supplies control signals C and $\overline{C}$ to the chopper unit 14 of FIGURE 4.

The sequence control gate signal G6DC is applied to an "and" gate 50, and the sequence control gate signal G7DC is applied to the "or" gate 44. The clock pulses T are applied to the "and" gate 50, and the output from the "and" gate is applied to the true input terminal of the decomplementing flip-flop N.

The initiation of the digitizing operation of the converter system of FIGURE 3 is under the control, for example, of the associated high speed digital computer, data processor, or other high speed digital handling equipment. The associated computer, or data processor, supplies a digitize command pulse $d$ to the system of FIGURE 3 to designate the beginning of the digitizing interval. This pulse is applied to the true input terminal of a synchronize flip-flop S. The true output terminal of the flip-flop S is connected to an "and" gate 52, and the converter clock pulses $t_1$ are also applied to that "and" gate. These clock pulses are also applied to the false input terminal of the flip-flop S and to an "and" gate 54.

The sequence control gate signal G7DC is also applied to the "and" gate 54. The "and" gate 52 is connected to the true input terminal of the digitize enable flip-flop D and to the true input terminal of the reset flip-flop R. The "and" gate 54 is connected to the false input terminal of the flip-flop D. The converter clock pulses $t_1$ are applied to the false input terminal of the reset flip-flop R.

When the converter system is set to its read-out condition, a series of read-out clock pulses $t_2$ are derived from the associated computer, data processor or other equipment. These latter clock pulses $t_2$ are applied to the "and" gate 42, and the converter clock pulse $t_1$ are applied to the "and" gate 40. The "and" gates 40 and 42 are connected to the "or" gate 38 to produce the clock pulses T.

For read-out purposes, the associated computer, data processor or other equipment, applies a read-out enable signal E to the system of FIGURE 2. The signal E is applied, for example, to the "and" gate 30 associated with the flip-flop Q1, and to the "and" gate 36 associated with that flip-flop. The term P from the polarity flip-flop P is applied to the "and" gates 28, 30 and 34. The term N from the decomplement flip-flop N is applied to the "and" gates 28 and 34. The term $\overline{P}$ from the polarity flip-flop P is applied to the "and" gate 36. The term A from the comparator amplifier of FIGURE 4 is applied to the "and" gate 32. The sequence control gate signal G1DC is applied to the "or" gate 24, and the sequence control gate signal G2DC is applied to the "and" gate 32.

An "and" gate 70 is connected to the true input terminal of the flip-flop Q2, and an "and" gate 72 is connected to the false input terminal of that flip-flop. An "or" gate 74 is connected to the "and" gate 70, and the clock pulses T are also applied to the "and" gate.

The sequence control signal G2DC is introduced to the "or" gate 74, and a pair of "and' gates 76 and 78 are also connected to the "or" gate 74. The terms P and N are applied to the "and" gate 76, and the terms E and $Q_1$ are applied to the "and" gate 78.

A group of three "and" gates 80, 82 and 84 is connected through an "or" gate 86 to the "and" gate 72. The clock pulses T are also applied to the "and" gate 72. The term R is introduced to the "or" gate 86.

The terms G3DC and A are introduced to the "and" gate 80. The terms P and N are introduced to the "and" gate 82, and the terms E and Q1 are introduced to the "and" gate 84. An "and" gate 90 is connected to the true input terminal of the flip-flop Q3. An "or" gate 92 is connected to the "and" gate 90, and the clock pulses T are also introduced to the "and" gate.

The sequence control gate signal G3DC is applied to the "or" gate 92, and a pair of "and" gates 94 and 96 is connected to the "or" gate. The terms P and N are applied to the "and" gate 94, and the terms E and Q2 are applied to the "and" gate 96.

An "and" gate 98 is connected to the false input terminal of the flip-flop Q3, and an "or" gate 100 is connected to the "and" gate. The clock pulses T are applied to the "and" gate 98, and an "or" gate 100 is also connected to the "and" gate. The reset term R is applied to the "or" gate 100. A group of flip-flops 102, 104 and 106 is connected to the "or" gate 100. The terms G4DC and A are applied to the "and" gate 102, the terms P and N are applied to the "and" gate 104, and the terms E and $\overline{Q2}$ are applied to the "and" gate 106.

An "and" gate 108 is connected to the true input terminal of the flip-flop Q4. An "or" gate 110 is connected to the "and" gate 108, and the clock pulses T are applied to the "and" gate. The sequence control gate signal G4DC is introduced to the "or" gate 110, and a pair of "and" gates 112 and 114 is connected to the "or" gate. The terms P and N are applied to the "and" gate 112, and the terms E and Q3 are applied to the "and" gate 114.

An "and" gate 116 is connected to the false input terminal of the flip-flop Q4. An "or" gate 118 is connected to the "and" gate, and the clock pulses T are applied to the "and" gate. The "and" gates 120, 122 and 124 are connected to the "or" gate 118. The terms G5DC and A are applied to the "and" gate 120. The terms P and N are applied to the "and" gate 122, and the terms E and $\overline{Q3}$ are applied to the "and" gate 124.

An "and" gate 130 is connected to the true input terminal of the flip-flop Q5. An "or" gate 132 is connected to the "and" gate 130, and the clock pulses T are also applied to the "and" gate 130. The sequence control gate signal G5DC is applied to the "or" gate 132, and a pair of "and" gates 134 and 136 also is connected to the "or" gate 132. The terms P and N are introduced to the "and" gate 134, and the terms Q4 and E are introduced to the "and" gate 136.

An "and" gate 140 is connected to the false input terminal of the flip-flop Q5, and an "or" gate 142 is connected to the "and" gate. The clock pulses T are applied to the "and" gate 140, and the reset term R is introduced to the "or" gate 142.

A group of "and" gates 144, 146 and 148 is connected to the "or" gate 142. The sequence control gate signal G6DC and the term A are applied to the "and" gate 144. The terms P and N are applied to the "and" gate 146, and the terms E and $\overline{Q4}$ are applied to the "and" gate 148.

The logic connections to the digitizing flip-flops Q1–Q5 described above can be expressed by the following logic equations:

$$Q_1' = (G1DC + DC + PN + PE)T$$
$$\overline{Q_1'} = (R + G2ADC + PN + \overline{PE})T$$
$$Q_2' = (G2DC + PN + Q1E)T$$
$$\overline{Q_2'} = (R + G3DCA + PN + \overline{Q1E})T$$
$$Q_3' = (G3DC + PN + Q2E)T$$
$$\overline{Q_3'} = (R + G4DCA + PN + \overline{Q2E})T$$
$$Q_4' = (G4DC + PN + Q3E)T$$
$$\overline{Q_4'} = (R + G5DCA + PN + \overline{Q3E})T$$
$$Q_5' = (G5DC + PN + Q4E)T$$
$$\overline{Q_5'} = (R + G6DCA + PN + \overline{Q4E})T$$

The remaining digitizing flip-flops Q6–Q10 may be similarly connected.

An "and" gate 150 is connected to the true input terminal of the polarity flip-flop P, and an "and" gate 152 is connected to the false input terminal. The sequence control gate signal $G^1$ is applied to the "and" gate 150, as are the output A from the comparator amplifier of FIGURE 4 and the clock pulses T. The clock pulses T are also applied to the "and" gate 152, and an "or" gate 154 is connected to the "and" gate. The terms E and R are applied to the "or" gate 154.

As mentioned above, the output voltage from the current summing bus 12 is transformed to a pulsating signal by the chopper unit of FIGURE 1, and the resulting pulsating signal is amplified by the comparator amplifier 18.

As also noted, the comparator amplifier 18 produces a true output when the feedback reference voltage ($V_{FB}$) is greater than the input voltage ($V_{IN}$), and a false output when the reference voltage ($V_{FB}$) is less than the input voltage ($V_{IN}$).

To preserve the accuracy of the comparator amplifier in the presence of the tremendous range of inputs which normally would be fed into it as the comparison sequence progresses during each digitizing operation, it is preferable to limit the amplitude of the inputs. This is achieved by means of a dual polarity voltage limiter, designated 201 in FIGURE 4. This voltage limiter includes an NPN transistor 200 and a PNP transistor 204.

In FIGURE 4, the common junction of the analog input voltage resistor 15 and the common bus 12 is connected to the base of the transistor 200, to a resistor 202, and to the base of the transistor 204. The transistor 200 may be of the type presently designated 2N1308. The transistor 204, on the other hand, may be of the type designated 2N1309. The resistor 202 may have a resistance, for example, of 510 ohms. The collectors of the transistors 200 and 204 are grounded. The other terminal of the resistor 202 is connected to the emitters of the transistors 200 and 204.

The dual polarity voltage limiter circuit formed by the transistors 200 and 204 serves to prevent the difference voltage between the analog input voltage ($V_{IN}$) and the reference feedback voltage ($V_{FB}$) from exceeding certain established positive and negative threshold voltages. The difference voltage is clipped by the limiter circuit 201 in a positive and negative direction, so that it cannot exceed a predetermined voltage level in either direction.

For example, should the difference voltage tend to exceed the predetermined voltage level in one direction, the transistor 200 becomes conductive to clamp the excess voltage to ground. On the other hand, should the difference voltage tend to exceed a predetermined level in the opposite direction, the transistor 204 becomes conductive to clamp the excess voltage to ground. The direct current difference voltage applied to the chopper 14 cannot exceed, therefore, a predetermined maximum positive or negaitve voltage, due to the action of the limiter circuit 201.

The particular illustrated limiter circuit is efficient for clipping low level voltages, of the order of 50 millivolts or less, without seriously attenuating signals below 1 millivolt. Back-to-back diodes actually operate in the same manner. However, the clipping level is of the order of 200 millivolts for germanium and 500 millivolts for silicon.

As mentioned above, the difference voltage is subsequently chopped by the chopper 14, prior to amplification by the comparator amplifier 18. The clamping action of the circuit of the transistors 200 and 204 is desirable, because if the chopped signal were not clamped, it would be possible for the comparator amplifier 18 to see an exceptionally wide dynamic range of signals. The amplifier's response to the large signals would then try to override the small signals. Therefore, in order for the amplifier 18 to discern the smallest possible signal, it is desirable that the amplitude of the larger signal be as close as possible to that of the smallest signal.

The use of the voltage limiter circuit 201 is possible in the present system, because no attempt is made to measure the magnitude of the difference voltage between the analog input and the voltage on the current summing bus 12. The only information that is necessary for any particular decision step is whether or not there actually is a difference voltage. Therefore, the amplitude of the difference voltage for the earlier steps in the process need not exceed the amplitude for final steps. For that reason, the difference voltage can be limited by the limiter circuit 201 so that the comparator amplifier 18 need not be capable of amplifying a wide range of signal amplitudes.

The emitters of the transistors 200 and 204 are connected to the junction of a pair of resistors 206 and 208 in the actual chopper 14. The resistor 208 may have a resistance, for example, of 470 ohms, and it is connected to the movable arm of a potentiometer 210. The potentiometer 210 may, for example, have a resistance of 100 kilo-ohms. One of the terminals of the potentiometer is connected to a resistor 212, and the other is connected to a resistor 214. The resistor 212 may have a resistance of 470 kilo-ohms, and it is connected to the positive terminal of a 28 volt direct voltage source. The other resistor 214 may also have a resistance of 470 kilo-ohms, for example, and it is connected to the negative terminal of the 28 volt direct voltage source. The potentiometer 210 may serve as a zero adjustment for the chopper 14.

The resistor 206 may, for example, have a resistance of 300 ohms. The resistor is connected to the emitter of an NPN transistor 216. The transistor 216 may be of the type designated 2N1308. The resistor 206 is also connected to the emitter of a PNP transistor 218. The latter transistor may be of the type designated 2N1309. The collectors of the transistors 216 and 218 are grounded. The base of the transistor 216 is connected to the cathode of a diode 220, the anode of which is grounded. The base of the transistor 218 is connected to the anode of a diode 222, the cathode of which is grounded. The diodes 220 and 222 may be of the type designated CTP790 by the Clevite Company.

The base of the transistor 216 is connected to a resistor 224, and the base of the transistor 218 is connected to a resistor 226. The resistors 224 and 226 may each have a value, for example, of 22 kilo-ohms, and both are connected to the positive terminal of a 12 volt direct voltage source.

The term C derived from the circuit of FIGURE 3 is introduced to the base of the transistor 216 through a resistor 230. The term $\overline{C}$ from the circuit of FIGURE 3 is introduced through a resistor 232 to the base of the transistor 218. Each of these resistors may have a resistance, for example, of 5.1 kilo-ohms, and they are shunted by respective variable trimmer capacitors 234 and 236. These capacitors may, for example, have a capacity of 100–400 micro-microfarads.

In order that the system of the present invention may operate with the required degree of precision, it is necessary that difference voltages between the analog input voltage ($V_{IN}$) and the reference feedback voltage ($V_{FB}$) on the summing bus 12 may be compared within, for example, 1 millivolt. A pure direct current comparison circuit, such as a differential amplifier, is undesirable for this degree of precision because of the inherent drift in direct current systems. It is for that reason that the chopper 14 in conjunction with the alternating current comparator amplifier 18 have been used in the system of the invention.

The use of transistors as switches in the chopper circuits requires that they be operated inversely, that is, using the collector as an emitter and the emitter as a collector, to minimize the saturation collector to emitter voltage drop and the reverse leakage current. Medium current alloy junction transistors are highly asymmetrical, providing forward or normal alphas considerably greater than the reverse alphas. For this reason, such devices are ideally suited for the low level switching required in the chopper unit.

To provide the desired high quality chopper action at the low level switching voltages, the two transistors 216 and 218 of opposite characteristics have been used, in such a manner that the inadequacies of each tend to cancel out.

The illustrated chopper circuit also has an advantage in that the driving voltage noise pulse is considerably reduced in both amplitude and duration. When the suggested circuit constants were used in a constructed embodiment, for example, the amplitude of the driving voltage noise pulse was reduced to less than 10 millivolts, and the duration to less than 0.1 microsecond base width.

The driving voltage noise pulse is produced in the output of the chopper as a result of the leading and trailing edges of the driving signal coupling through the relatively large base to emitter capacity of the transistors. This noise pulse becomes more troublesome as the chopping rate increases. With many prior art chopper circuits, noise spikes of the order of 100 millivolts or greater have been observed. The presence of these noise spikes complicates the design of the associated alternating current amplifier, since it must be capable of handling fraction of a millivolt signals in the presence of large noise signals. The illustrated chopper circuit functions to reduce these noise spikes to a minimum.

In the operation of the chopper circuit 14, the characteristics of the NPN transistor 216 and of the PNP transistor 218 have been combined. These transistors are connected in parallel, and both are turned on and off simultaneously, by the action of the control signals C and $\overline{C}$. Since the driving voltages for both transistors are approximately equal and of opposite polarity, noise pulses coupled through the respective base to emitter capacities of the transistors tend to cancel, resulting in a small noise spike of minimum amplitude and duration.

The adjustable trimmer capacitors 234 and 236 connected across the resistors 230 and 232 provide compensation for differences in transistor capacities and in the rise and fall times of the driving voltage.

If the reverse bias applied to the transistors 220 and 222 exceeds a few tenths of a volt, the "off" transistor properties may deviate unfavorably from the low level predictions. Therefore, the clamping diodes 220 and 222 are inserted between the bases of the respective transistors and ground to prevent the "off" voltage from becoming excessive. This means, however, that the plus and minus voltages occurring at the junction of the two emitters of the respective transistors which exceed the relatively low back bias on either transistor will prevent one or the other of the transistors from turning completely off. However, such a voltage implies a large unbalance between the analog input voltage and the reference voltage on the summing bus 12. Therefore, when both transistors are turned on again, clamping the aforementioned junction to zero, a large change will be coupled to the comparator amplifier 18 indicating the unbalance. On the other hand, when the two voltages are almost equal, and of opposite polarity, the aforementioned junction voltage will be only a few millivolts above or below ground, and the switching transistors 216 and 218 will approach the ideal condition.

It should be pointed out that the chopper 14 does not function as an "on-off" switch. Rather, the chopper circuit periodically, by virtue of both transistors 216 and 218 simultaneously becoming conductive, establishes the normal signal path at ground potential.

The chopper circuit 14 can be controlled by a fixed on-off direct current signal, such as the signal C. The chopper is capable of chopping at high frequencies, and does not "float" when the signal C goes false. That is, it does not require a constant alternating current input, but is controllable to have one stable state when the signal C is "on," and a second stable state when the signal C is "off."

This latter feature permits the chopper to be turned "off," that is, to establish the signal path at ground potential, merely by holding the signal C "off" or its "false" state. This permits the chopper 14 to be used to isolate the comparator amplifier 18 during read-out of the system.

To reiterate, therefore, the features of the chopper circuit 14 include the provision of driving both transistors 216 and 218 on and off simultaneously, so that the spikes due to stray capacity cancel in the output. The trimmer capacitors 234 and 236 are adjusted to equalize the rise times of the input signals C, $\overline{C}$, so that the spikes in the output are minimized greatly.

This cancellation of switching spikes in the output from the chopper 14 is most important in the system of the invention. This is because the amplifier 18 is intended to distinguish 1 millivolt signal amplitudes. Such amplitudes would be completely deluged by normal spikes in the output from the chopper.

Another feature of the chopper 14 is the use of the NPN transistor 216 and the PNP transistor 218. These transistors are manufactured to have essentially similar characteristics. Any parameter variations in the transistors tend to cancel; especially for example, under conditions of varying ambient temperatures.

In a constructed embodiment, the chopper 14 operated at a rate of 70 kilocycles. It is contemplated that chopping rates of the order of 140 kilocycles will be used.

The potentiometer 210, as indicated, serves as a zero adjustment. This potentiometer causes a balancing current to be supplied to the chopper circuit, so that exactly zero output will be exhibited in the presence of zero input.

Therefore, operating in the manner outlined above, the chopper 14 (Part A) serves to "chop" the difference voltage, by periodically reducing the amplitude of the amplitude-limited difference voltage to ground. The resulting pulsating voltage is introduced to the input of the comparator amplifier 18 through the coupling capacitor 16 of FIGURE 1. The coupling capacitor may have a capacity, for example, of 0.1 microfarad.

The capacitor 16 is connected to the base of a PNP transistor 242 and to a grounded resistor 244. The transistor 242 is connected as an emitter follower to provide high input impedance from the amplifier 18. The transistor may be of the type designated, for example, 2N1754. The resistor 244 may have a resistance of 100 kilo-ohms. The collector of the transistor 242 is connected to a resistor 245 which, in turn, is connected to the negative terminal of a 12 volt direct voltage source. The resistor 244 may have a resistance, for example, of 5.1 kilo-ohms.

The emitter of the transistor 242 is connected to a resistor 246 and to a resistor 248. The resistor 246 may have a resistance, for example, of 5.1 kilo-ohms, and it is connected to the positive terminal of a 10 volts direct voltage source. The resistor 248 may have a resistance, for example, of 100 ohms, and it is connected to a resistor 250 and to the base of a PNP transistor 252. The transistor 252 is connected as a second emitter follower. The resistor 250 may have a resistance of 20 kilo-ohms, and the transistor 252 may be of the type designated 2N1754.

The resistor 250 is connected to the collector of a PNP transistor 254. The transistor 254 is connected as a common base amplifier stage for high gain and wide bandwidth. The latter transistor may also be of the type designated. 2N1754. The emitters of the transistors 250 and 254 are connected to respective grounded resistors 256 and 258, and a capacitor 260 intercouples the emitters. The resistor 256 may have a resistance of 10 kilo-ohms, and the resistor 258 may have a resistance of 20 kilo-ohms. The capacitor 260 may have a capacity of 1 microfarad.

The collector of the transistor 252 is connected to a resistor 260, and the collector of the transistor 254 is connected to a resistor 262. The resistor 260 may have a resistance of 3.9 kilo-ohms, and it is connected to the negative terminal of the 12 volt direct voltage source. The resistor 262 may have a resistance of 6.8 kilo-ohms, and it also is connected to the negative terminal of the 12 volt direct voltage source.

The collector of the transistor 252 is connected to the base of an NPN transistor 264. The latter transistor may be of the type designated 2N1308. The emitter of the transistor 264 is connected to a resistor 266. The resistor 266 may have a resistance, for example, of 2 kilo-ohms, and it is connected to the negative terminal of the 12 volt direct voltage source. The collector of the transistor 264 is connected to a resistor 268, and to the base of a PNP transistor 270. The resistor 268 may have a resistance of 6.2 kilo-ohms, and it is grounded. The transistor 270 is of the PNP type, and may be of the type presently designated 2N1754. The transistors 264 and 270 are connected as direct current amplifier stages for additional gain.

The emitter of the transistor 270 is connected to the junction of a resistor 272 and of a grounded resistor 274.

The resistor 274 may have a resistance of 1 kolo-ohm, and the resistor 272 may have a resistance of 2 kilo-ohms. The resistor 272 is connected back to the base of the transistor 254 and to a grounded resistor 276. The resistor 276 may have a resistance, for example, of 27 kilo-ohms.

The collector of the transistor 270 is connected to a resistor 280 which, in turn, is connected to the negative terminal of a 15 volt direct voltage source. The resistor 280 may have a resistance, for example, of 3 kilo-ohms.

The collector of the transistor 270 is also connected to the base of a PNP transistor 282, and to the base of an NPN transistor 283. The transistor 282 may be of the type designated 2N404, and the transistor 283 may be of the type designated 2N1308. The collector of the transistor 283 is grounded. The collector of the transistor 282 is connected to the negative terminal of the 15 volt direct voltage source. The emitters of the transistors 282 and 283 are connected to a grounded resistor 284 and to a coupling capacitor 286. The resistor 284 may have a resistance of 3 kilo-ohms, and the coupling capacitor 286 may have a capacitance of .01 microfarad. The transistors 282 and 283 are connected as complementary emitter followers to drive the load in both directions.

The comparator amplifier 18 is connected as a known type of transistor amplifier, negative feedback being used to assure direct current stability and linearity in the amplifying characacteristics thereof.

The output of the comparator amplifier 18 is applied to a second chopper which is designated chopper 15. The circuitry of the second chopper is essentially the same as the chopper 14 described above, and the circuit details will not be repeated herein. The purpose of the chopper 15 is to re-establish the output from the comparator amplifier 18 on a ground reference. The output becomes, therefore, an amplified replica of the input.

The output from the chopper 15 is applied through a 1 kilo-ohm resistor 288 to the base of a grounded emitter PNP transistor 290. The transistor 290 may be of the type designated 2N1754. The base of the transistor 290 is connected to a resistor 292 which may, for example, have a resistance of 39 kilo-ohms, and which is connected to the negative terminal of the 12 volt direct voltage source. The collector of the transistor 290 is connected to a resistor 294 which may, for example, have a resistance of 2 kilo-ohms, and which is connected to the negative terminal of the 15 volt direct voltage source.

The collector of the transistor 290 is also connected to a 300 ohm resistor 296 which, in turn, is connected to the output terminal of the system and to a grounded capacitor 298. The capacitor 298 may have a capacity, for example, of .0018 microfarad.

The amplified output term A is produced at the output terminal of the system, as indicated. The term A is true (−6 volts), whenever the analog input voltage ($V_{IN}$) is less than the reference feedback voltage ($V_{FB}$) on the current summing bus 12. The term A is false (0 volts), whenever the analog input voltage is equal or greater than the reference feedback voltage.

Appropriate circuitry for the current switches $I_P$, $I_1$–$I_6$ of FIGURE 1 is shown in FIGURE 5. The illustrated circuitry uses transistors, rather than diodes, because of the relatively small voltage drop in the transistor which preserves the precision of the switching and summing circuitry.

The current switch $I_P$ is composed of a pair of PNP transistor 302 and 304. The transistors may be of the type presently designated 2N1307. The emitter of the transistor 302 is connected to a grounded resistor 306 which may have a resistance of 800 ohms. The collector of the transistor 302 is connected to the collector of the transistor 304 and to the positive terminal of a 6.4 volt precision voltage source. The emitter of the transistor 304 is connected to an output terminal which is designated $\overline{p}$.

The polarity flip-flop P has its false output terminal connected to the input terminad designated $\overline{P}$ in FIGURE 5, and the flip-flop has its true output terminal connected to the input terminal designated P. The terminal P is connected to a resistor 308 which, in turn, is connected to the base of the transistor 302. The terminal P, on the other hand, is connected to a resistor 310 which, in turn, is connected to the base of the transistor 304.

A pair of resistors 312 and 314 are connected in series across the bases of the transistors 302 and 304. The common junction of the resistors 312 and 314 is connected to the positive terminal of a 12 volt direct voltage source. A pair of resistors 316 and 318 are connected in series across the input terminals P and $\overline{P}$. The common junction of these latter resistors is connected to the negative terminal of a 15 volt direct voltage source.

The resistors 308 and 310 each have a resistance, for example, of 2 kilo-ohms. The resistors 312 and 314 each, for example, have a resistance of 1.2 kilo-ohms. The resistors 316 and 318 each, for example, have a resistance of 1 kilo-ohm.

The current switch $I_1$, and the other current switches of FIGURE 5, to be described, are constructed to maintain an essentially constant load on the precision 6.4 volt voltage source, regardless of whether the corresponding precision resistance element is switched in or out of the summing circuit.

The terminal $\overline{p}$ for example, is connected to the precision resistance element $R_P$, as will be described in conjunction with FIGURE 6. The resistor 306 has a value essentially equal to the value of the resistance element $R_P$.

When the flip-flop P is in a true state to represent the presence of a negative input voltage ($V_{IN}$), the transistor 304 is rendered conductive, so that the precision resistance element $R_P$ is connected to the 6.4 volt precision voltage source. The tranistor 302, at the same time, is rendered non-conductive.

On the other hand, when the flip-flop P is in a false state to represent the presence of a positive input voltage ($V_{IN}$), the transistor 304 is rendered non-conductive and the transistor 302 is rendered conductive. This causes the precision resistance element $R_P$ to be disconnected from the precision voltage source, but simultaneously connects the equal value grounded resistor 306 to the source.

This assures that constant load is maintained on the precision voltage source, regardless of the state of the flip-flop P, so that any tendency for the voltage from the source to vary in the presence of load changes is eliminated.

The transistors 302 and 304, and the transistors included in the current switches to be described, are connected in an inverse manner as compared with their usual connections in a typical transistor circuit. This inverse connection permits the transistors to function as low level switches, and to exhibit negligible voltage drops when in the conductive condition. This permits the associated precision resistance elements to function with a high degree of accuracy, and without the inclusion of concommitant reading errors due to extraneous voltage drops in their associated switching circuitry.

The $I_1$ current switch includes a pair of transistors 320 and 322. These latter transistors are of the NPN type. The emitter of the transistor 320 is connected to a grounded resistor 324. The resistor 324 may, for example, have a resistance of 1.6 kilo-ohms The emitter of the transistor 322 is connected to an output terminal designated $q_1$. The collectors of the transistors 320 and 322 are connected together and to the negative terminal of the 6.4 volt direct voltage precision source.

The output terminals of the digitizing flip-flop Q1 are connected respectively to input terminals designated Q1 and $\overline{Q1}$. These input terminals are connected through respective resistors 326 and 328 to the corresponding base electrodes of the transistors 320 and 322. These resistors may each have a resistance, for example, of 2 kilo-ohms. A pair of resistors 330 and 332 are connected in series across the base electrodes of the transistors 320 and 322. Each of these resistors may have a resistance, for example, of 5.1 kilo-ohms. The common junction of the resistors is connected to the negative terminal of the 15 volt direct voltage source.

The current switch $I_2$ comprises a pair of transistors 334 and 336. These transistors, likewise, are of the NPN type. The emitter of the transistor 334 is connected to a grounded resistor 338. The resistor 338 has a resistance, for example, of 3.3 kilo-ohms. The emitter of the transistor 336 is connected to an output terminal $q_2$. The collectors of the transistors 334 and 336 are connected together and to the negative terminal of the 6.4 volt precision voltage source.

The output terminals of the digitizing flip-flop Q2 are connected respectively to the input terminals designated Q2 and $\overline{Q2}$. These input terminals are connected through respective 3 kilo-ohm resistors 340 and 342 to the corresponding base electrodes of the transistors 334 and 336. A pair of resistors 344 and 346 are connected in series across the base electrodes of the transistors 334 and 336. Each of these latter resistors may have a resistance of 7.5 kilo-ohms. The common junction of the resistors 344 and 346 is connected to the negative terminal of the 15 volt direct voltage source.

The current switch $I_3$ includes a pair of NPN transistors 348 and 350. The emitter of the transistor 348 is connected to a grounded resistor 352 which may, for example, have a resistance of 6.2 kilo-ohms. The emitter of the transistor 350 is connected to an output terminal designated $q_3$. The collectors of the transistors 348 and 350 are connected together and to the negative terminal of the 6.4 volt precision voltage source.

The output terminal Q3 of the digitizing flip-flop Q3 is connected to a similarly designated input terminal, and the output terminal $\overline{Q3}$ of that flip-flop is also connected to a similarly designated input terminal. The terminal Q3 is connected to a resistor 353 which, in turn, is connected to the base of the transistor 348. The terminal $\overline{Q3}$ is connected to a resistor 354 which, in turn, is connected to the base of the transistor 350. Each of the resistors 352 and 354 may have a resistance of 7.5 kilo-ohms.

A pair of resistors 356 and 358 are connected in series across the base electrodes of the transistors 348 and 350. Each of these resistors may have a resistance of 20 kilo-ohms. The common junction of the resistors 356 and 358 is connected to the negative terminal of the 15 volt direct voltage source.

The current switches $I_1$, $I_2$ and $I_3$ operate in essentially the same manner as the current switch $I_P$. The latter current switches in each instance incorporate respective grounded resistors 324, 338, 352 having respective values corresponding to the associated precision resistance elements $R_1$, $R_2$, $R_3$.

The latter current switches incorporate NPN transistors, so that the normal connections of the digitizing flip-flops $Q_1$, $Q_2$ and $Q_3$ to the current switches is reversed. That is, the connections are such that the transistor 322 is rendered conductive, for example, when the flip-flop $Q_1$ is in its true state, this being achieved by connecting the false output terminal of the flip-flop $Q_1$ to the base of that transistor.

Therefore, whenever the flip-flop $Q_1$, $Q_2$ or $Q_3$ is in its true state, the corresponding precision resistance element $R_1$, $R_2$ or $R_3$ is connected into the precision voltage source. However, if any of these flip-flops is set false, the associated grounded resistor 324, 338 or 352 is connected to the precision voltage source to maintain an essentially constant load on the source, regardless of the state of the flip-flops.

Similar circuitry may be used for the current switch $I_4$, with the appropriate parameters and circuit constants being used therein. The current switches $I_5$ and $I_6$ may be similar, with appropriate circuit constants being chosen for each. For that reason, only the switching circuit $I_6$ is shown in detail.

The switching circuit $I_6$ includes a pair of NPN transistors 360 and 362. The emitter of the transistor 360 is connected to a grounded resistor 364. This resistor may have a resistance, for example, of 5.6 kilo-ohms. The emitter of the transistor 362 is connected to a precision resistance element 366 which, in turn, is connected to a precision resistance element 368 and to an output terminal designated $q_6$. The precision resistance element 366 may have a resistance of 4.8 kilo-ohms, and the precision resistance element 368 may have a resistance of 1 kilo-ohm. The collectors of the transistors 360 and 362 are connected together, and to the negative terminal of the 6.4 volt precision voltage source.

The precision resistance element 368 is connected to the emitter of a PNP transistor 370. The collector of the transistor 370 is grounded, and the base is connected to the junction of a pair of resistors 372 and 374. The resistor 372 may have a resistance of 1 kilo-ohm, and the resistor 374 may have a resistance of 15 kilo-ohms. The resistor 374 is connected to the positive terminal of the 12 volt direct voltage source.

The output terminals of the digitizing flip-flop Q6 are connected to similarly designated input terminals. The input terminal Q6 is connected to the resistor 372 and to a resistor 375. The input terminal $\overline{Q6}$ is connected to a resistor 376. The resistors 375 and 376 may each have a resistance of 7.5 kilo-ohms, and they are connected respectively to the respective base electrodes of the transistors 360 and 362.

A pair of resistors 378 and 380 are connected in series across the base electrodes of the transistors 360 and 362. Each of these resistors may have a resistance of 20 kilo-ohms. The common junction of the resistors 378 and 380 is connected to the negative terminal of the 15 volt direct voltage source.

The switching circuits $I_5$ and $I_6$ are essentially similar to the switching circuits described above. In the latter switching circuits, however, unless some provision is made, the precision resistance elements $R_5$ and $R_6$ and associated grounded resistors, such as the resistor 364, normally have relatively high values. This is because the values of the resistance elements in the summing circuit normally increases in a binary sequence towards the least significant digit circuit.

In order to maintain a high switching rate, which would not be possible with the normal high resistance precision resistance elements, the circuit ($I_6$) or FIGURE 6, in effect, provides a voltage divider network so that the value of the voltage from the precision voltage source is reduced in a precisely controlled ratio. This enables the value of the precision resistance element ($R_6$) and of the corresponding grounded resistor 364 to the reduced in a similar ratio, so that the high switching speed can be maintained.

In the circuit $I_6$, when the flip-flop Q6 is set true, both the transistors 362 and 370 become conductive. The transistors thereby connect the precision resistance elements 366 and 368 across the precision voltage source as a voltage divided. The reduced voltage is introduced by way of the output terminal $q6$ to the precision resistance element $R_6$. Therefore, as mentioned, the precision resistance element $R_6$ may have a reduced value, as may the associated grounded resistor 364. This, as noted, permits the high switching speed of the higher digit circuits to be maintained in the lower digit circuits.

The output terminal $\overline{p}$ of the circuit of FIGURE 5 is connected to a variable resistor 400 which may, for example, have a resistance of 200 ohms. The variable resistor 400 is connected to a precision resistance element 402 which may have a resistance of 700 ohms, and which is connected to the current summing bus 12.

The output terminal $q_1$ of FIGURE 5 is connected to a precision resistance element 404 ($R_1$) which may, for example, have a resistance of 1.6 kilo-ohms. The terminal $q_2$ of FIGURE 5 is connected to a precision resistance element 406 ($R_2$) which may, for example, have a resistance of 3.2 kilo-ohms. The output terminal $q_2$ is connected to a precision element 408 ($R_3$) which may, for example, have a resistance of 6.4 kilo-ohms. The output terminal $q_4$ of FIGURE 5 is connected to a precision resistance element 410 ($R_4$) which may, for example, have a resistance of 12.8 kilo-ohms.

The output terminal $q_5$ of FIGURE 5 is connected to a precision resistance element 412 ($R_4$) which may, for example, have a resistance of 4 kilo-ohms. The output terminal $q_6$ of FIGURE 5 is connected to a precision resistance element 414 (R ) which may, for example, have a resistance of 8 kilo-ohms. The precision elements 402, 404, 406, 408, 410, 412 and 414 are all connected to the summing bus 12.

As mentioned above, the precision resistance elements $R_P$, $R_1$–$R_6$ are selectively connected into circuit with the summing bus 12 under the control of the flop-flops $Q_P$, $Q_1$–$Q_6$; and of the current switches of FIGURE 5. The precision resistance elements $R_1$–$R_6$ are selectively connected to the negative precision voltage source in the described manner, successively to reduce the voltage on the bus 12 to essentially zero.

When the input voltage ($V_{IN}$) is positive, the precision resistance $R_P$ is disconnected, and the initial positive voltage on the bus 12 is a direct representation of the value of the analog input voltage. When the input voltage is negative, however, the precision resistance element $R_P$ is connected to the positive precision voltage source, so that the initial positive voltage on the bus 12 corresponds to the algebraic sum of the voltage due to that connection and the negative analog input voltage.

The variable resistor 400 permits the effective positive reference precision voltage to be balanced with the effective negative reference precision voltage.

The digitizing flip-flop Q7 controls a precision resistance element 416 ($R_7$) which may, for example, have a resistance of 96 kilo-ohms. The resistance element 416 is connected to the negative terminal of the 6.4 volt direct voltage source, and to the cathodes of a pair of diodes 418 and 420. The anode of the diode 418 is connected to the summing bus 12, and the anode of the diode 420 is connected to the collector of a PNP transistor 422. The collector of the transistor 422 is also connected to a resistor 424. The resistor 424 may, for example, have a resistance of 5.1 kilo-ohms, and it is connected to the negative terminal of the 5 volt direct voltage source.

The emitter of the transistor 422 is connected to the positive terminal of a 2 volt direct voltage source. The base electrode is connected to the junction of a pair of resistors 426 and 428. The resistor 426 may have a resistance of 11 kilo-ohms, and it is connected to the positive terminal of the 12 volt direct voltage source. The resistor 428 may have a resistance of 5.1 kilo-ohms, and it is connected to the false output terminal $\overline{Q7}$ of the digitizing flip-flop Q7.

The current switches $I_8$ and $I_9$ may be similar to the circuit $I_7$, and will not be described in detail. In each of these latter switching circuits, of course, the appropriate parameters will be used.

Appropriate circuitary for the current switch $I_{10}$ may be similar to that shown for the current switch $I_7$. This latter circuitry serves to connect a precision resistance element 430 to the summing bus 12. The resistance element 430 may, for example, have a resistance of 750 kilo-ohms. The resistance element is connected to the negative of the 6.4 volt direct voltage source and to the cathodes of a pair of diodes 432 and 434. The anode of the diode 432 is connected to the summing bus 12, and the anode of the diode 434 is connected to the collector of a PNP transistor 436.

The emitter of the transistor 436 is connected to the positive terminal of the 2 volt direct voltage source, and the base electrode of the transistor is connected to the junction of a pair of resistors 440 and 442. The resistor 442 has a resistance of 11 kilo-ohms, and it is connected to the positive terminal of the 12 volt direct voltage source. The resistor 440 has a resistance of 5.1 kilo-ohms, and it is connected to the false output terminal $\overline{Q10}$ of the digitizing flip-flop Q10. The collector of the transistor 436 is also connected to a resistor 444. The latter resistor may have a resistance of 5.1 kilo-ohms, and it is connected to the negative terminal of the 5 volt direct voltage source.

For the lower digit circuits $I_7$–$I_{10}$, the precision resistance elements $R_7$–$R_{10}$ switched in and out of the circuit have such a relatively high value, that the load fluctuations produced on the precision voltage source due to the switching of these elements is negligible. Therefore, there is no need for the balancing switching circuits described in conjunction with FIGURE 5. Also, the transistors of the previous switching circuits may be replaced by usual diodes for the lower digit circuits.

The switching circuit $I_7$ operates in the following manner. When the flip-flop Q7 is in its false state, the transistor 422 is rendered conductive. This causes the diode 420 to become conductive effectively to block the diode 418, so that the precision resistance element 416 ($R_7$) is disconnected from the current summing bus 12.

However, when the flip-flop Q7 is in its true state, the transistor 422 is rendered non-conductive to block the diode 420. The diode 418 then becomes conductive, so that the precision resistance element 416 ($R_7$) is effectively connected to the current summing bus 12. The value of the resistance element 416 ($R_7$) is selected to compensate for the voltage drop across the diode 418 when the diode is in its conductive state.

The system of the invention utilizes various sequence control gate signals, as mentioned previously herein, which are designated G1DC–G12DC. These sequence control gate signals are generated during the digitizing operation, and they are made to occur during each successive bit time during the digitizing operation.

The generation of the sequence control gate signals G1DC–G12DC may be accomplished by the circuitry of FIGURE 5. The illustrated circuitry is extremely simple, and it requires but a single transistor for the generation of each gate signal. The individual circuits are controlled, for example, by the digitizing flip-flops as they proceed from their true to their false states. A resistance-capacitance network is provided in each circuit in FIGURE 5, which produces a pulse in response to the corresponding transition. The width of the pulse is made great enough to extend to the next clock pulse $t_1$. The signal C from the multivibrator of FIGURE 3 is used in the generation of the gate signals, so that each gate signal will be terminated at exactly midway between successive clock pulses $t_1$. The enable term D from the flip-flop D of FIGURE 3 is also used in the formation of the sequence control gate signals, so that the gate signals will be produced only during the digitizing operation, and not during read-out.

In like manner, the first sequence control gate signal G1DC is produced by the transition of the reset flip-flop R of FIGURE 3 between its false and its true states, and the final sequence control gate signal G12DC is produced by the transition of the decomplement flip-flop N of FIGURE 3 between its true and its false states.

The logic circuitry of FIGURE 5 includes, for example, a PNP transistor 450. This transistor may be of the type designated 2N404. The emitter of the transistor 450 is grounded. The term R from the reset flip-flop R of FIGURE 3 is introduced through a capacitor 452 to the base of the transistor 450. The capacitor 452 may, for example, have a capacity of .0018 microfarad.

The collector of the transistor 450 is connected to a resistor 454. The resistor 454 may have a resistance of 10 kilo-ohms, and it is connected to the negative terminal of the 15 volt direct voltage source. The base of the transistor 450 is connected to a resistor 456. This latter resistor may have a resistance of 39 kilo-ohms, and it, likewise, is connected to the negative terminal of the 15 volt direct voltage source. The term DC is applied to the anode of a diode 458, the cathode of which is connected to the collector of the transistor 450. The collector of the transistor is also connected to an output terminal designated $G_1DC$, at which the sequence control gate signal $G_1DC$ is formed.

As noted, when the reset flip-flop R of FIGURE 3 is actuated from its false to its true state, the resulting signal introduced through the capacitor 452 causes the transistor 450 to produce an output pulse at the terminal $G_1DC$. The time constant of the resistor 456 and capacitor 452 is such that the pulse produced at the output terminal is long enough to extend beyond the time of the next clock pulse $t_1$. The term DC assures that the sequence control gate signal $G_1DC$ is produced only during the digitizing operation, and that the gate signal is terminated midway between the next clock pulse $t_1$ and the following clock pulse $t_1$.

By similar illustrated circuitry, the sequence control gate signal G2DC is produced by the digitizing flip-flop Q1; the sequence control gate signal G11DC is produced by the flip-flop Q10; and the sequence control gate signal G12DC is produced by the flip-flop N. The other gate signals G3DC–G10DC are produced by similar circuitry (not shown) and by the digitizing flip-flops Q2–Q9 respectively.

The curves of FIGURE 6 are useful in explaining the operation of the particular embodiment of the invention shown in FIGURES 2 and 3. As mentioned above, the system of FIGURE 2 includes only five digitizing flip-flops Q1–Q5 for purposes of simplicity, and for that reason, only seven of the sequence gate signals are used, as illustrated G1DC–G7DC in the curves of FIGURE 6.

To initiate a digitizing operation in the system of the invention, the associated equipment, such as a high speed digital computer, introduces the digitizing command pulse "*d*" to the system. This pulse must first be synchronized with the converter clock pulses $t_1$, and this synchronization is achieved by the synchronizing flip-flop S and the digitize enable flip-flop D.

The logic circuit controlling the flip-flop S is so devised that the flip-flop is normally reset in its false state. Then, when the flip-flop S is set true, the next converter clock pulse $t_1$ resets the flip-flop false. It is assured, therefore, that no matter when the digitizing command pulse *d* is introduced to the converter system, the flip-flop S will be false. The pulse *d* is applied directly to the flip-flop S, and serves to set the flip-flop to its true state.

When the synchronizing flip-flop S is set true by the digitize command pulse pulse *d*, it enables the "and" gate 52 in FIGURE 3, so that the digitize enable flip-flop D is set true by the next converter clock pulse $t_1$. This same clock pulse $t_1$ resets the synchronizing flip-flop S to its false state. However, the digitize enable flip-flop D remains true throughout the digitizing operation, and until it is reset false by the first converter clock pulse $t_1$ to occur after the end of the digitizing interval upon the occurrence of the sequence control gate G7, the latter pulse enabling the "and" gate 54.

When the digitize enable flip-flop D is true, the "and" gate 40 is enabled so that the clock pulses T are composed of the converter clock pulses $t_1$. The true state of the digitize enable flip-flop D permits the P and Q flip-flops to be clocked by the converter clock pulses during the digitizing interval, as is desired. On the other hand, when the digitize enable flip-flop D is set false, the clock term T is made up of the external clock pulses $t_2$.

The false state of the flip-flop D permits the P and Q flip-flops to be clocked by the external clock pulses $t_2$ during read-out, as is also desired.

At the beginning of the digitizing interval, the same converter clock pulse $t_1$ which resets the synchronizing flip-flop S and sets the digitize enable flip-flop D is used to set the reset flip-flop R to its true state. When the reset flip-flop R is true, the "and" gate 46 is enabled, so that the next converter clock pulse $t_1$ resets the decomplement flip-flop N to its false state. At the same time, the "and" gate 152 of FIGURE 3 is enabled so that the polarity flip-flop P is reset false; and the "and" gates 140, 116, 98, 72 and 22 of FIGURE 3 are enabled so that the digitizing flip-flops Q1–Q5 are reset false. Once the reset has been accomplished, the reset flip-flop R is reset false, this being accomplished by the next succeeding converter clock pulse $t_1$.

To best illustrate the successive approximations process of the system of the invention, it will be first assumed in a particular example that a positive analog input voltage ($V_{IN}$) of 19 "units" is applied to the system. One "unit" is defined as the least voltage increment which can be resolved by the system. As shown in FIGURE 5, this analog input voltage ($V_{IN}$) and the reference feedback voltage ($V_{FB}$) are combined by means of a resistance network formed by the resistor 75 and the precision resistance elements of FIGURE 6 which are switched into the circuit by the operation of the digitizing flip-flops.

The feedback reference voltage ($V_{FB}$) is always opposite in polarity to the analog input voltage ($V_{IN}$), as described, and the voltage on the current summing bus 12 will vary in a positive and negative sense with respect to ground, as dictated by the relative amplitudes of these two voltages.

The voltage limiter circuit 201 of FIGURE 4 prevents the voltage introduced to the comparator amplifier 18 from the chopper 14 from exceeding predtermined positive and negative limits, as explained above. The function of the chopper 14 (FIGURE 4), as also explained, is to convert the direct current voltage from the limiter 201 to a pulsating form, suitable for amplification by the alternating current comparator amplifier 18.

As described above, in conjunction with FIGURE 4 the chopping action of the chopper 14 is controlled by the C, $\overline{C}$ signal derived from the free running oscillator C of FIGURE 3. The control by the signal C, $\overline{C}$ is such, that the chopper circuit causes the input to the comparator amplifier 14 to be reduced in amplitude to ground potential at times occurring exactly half-way between successive ones of the converter clock pulses $t_1$.

Since the transistors 216 and 218 in the chopper 14 are complementary, both are turned on and off simultaneously by the signal C and $\overline{C}$, as noted above. Therefore, the point J. representing the common junction of the emitters of the two transistors, is alternately connected to ground and then allowed to assume a positive or negative voltage. The latter voltage depends upon the relative values of the analog input voltage ($V_{IN}$) (which remains essentially constant during the digitizing process), and of the reference feedback voltage ($V_{FB}$) (which changes during the successive approximations steps of the digitizing process).

The resulting amplitude-limited pulsating signal from the chopper 14 is amplified by the comparator amplifier 18, and the resulting amplified signal is introduced to the chopper 15 through the emitter follower circuit of the transistor 282. The chopper 15 re-establishes the amplified signal as a series of ground-reference pulses, and these latter pulses are amplified by the grounded emitter circuit of the transistor 290. The resulting output signal A is true (−6 v.) or false (0 v.), depending upon whether the analog input voltage ($V_{IN}$) is smaller or larger than the particular value of the reference feedback voltage ($V_{FB}$).

The sequence control gates G1DC–G7DC are generated by the circuit of FIGURE 5 as described above. As described, the circuit of transistor 450 in FIGURE 5 responds to the positive transition of the R term from the reset flip-flop R. By the alternating coupling through the capacitor 452 of this positive transition to the base of the PNP transistor switch 450, which is normally biased on by the resistor 456, the sequence control gate G1 is generated. By the proper selection of the coupling time constant, the sequence control gate G1 is made wide enough to embrace the next succeeding clock pulse $t_1$, and it is "anded" with the term DC for the above-stated reasons.

The sequence control gate G1DC is "anded" with the comparator amplifier output A in the "and" gate 150 of FIGURE 2, so that the polarity flip-flop P can be set true at the beginning of the digitizing operation, in the event that the analog input voltage ($V_{IN}$) is negative. The comparator amplifier output term A is true at this time in the presence of a negative analog input voltage.

In the first example under consideration, the analog input voltage ($V_{IN}$) is assumed to be positive, so that the comparator amplifier output term A is false at G1DC time, and the polarity flip-flop P, therefore, remains false to indicate the positive analog input.

The sequence control gate G1DC becomes true between successive converter clock pulses $t_1$. The succeeding clock pulse $t_1$ after the G1DC gate is true, therefore, sets the polarity flip-flop P true if the term A is true, and also sets the most significant digit flip-flop Q1 true. Therefore, the analog voltage input ($V_{IN}$) is first examined for positive or negative polarity before any ($V_{FB}$) reference voltage is developed on the summing bus 12.

As noted above, the sequence control gate G1DC also enables the "and" gate 20 associated with the most significant digit flip-flop Q1, so that the next converter clock pulse $t_1$ sets the flip-flop Q1 true. Setting the most significant digit flip-flop Q1 true results in the reference feedback voltage ($V_{FB}$) assuming a negative value equal to one-half full scale (or −16 units).

Before the occurrence of the next converter clock pulse $t_1$, the chopper transistors 216 and 218 of the chopper 201 in FIGURE 4 are both rendered non-conductive, and the voltage at the point J changes to a value determined by the algebraic sum of the two voltages ($V_{IN}$) and ($V_{FB}$). Since in the example under consideration ($V_{IN}$) is +19 units and ($V_{FB}$) is −16 units, the junction voltage J becomes positive. This results in a positive-going input to the comparator amplifier, making the comparator amplifier output term A false. Therefore, the term A is false at the occurrence of the G2 sequence control gate, and the most significant digit flip-flop Q1 of FIGURE 2 is left in its true state.

The next digitizing flip-flop Q2 is then set true by the following converter clock pulse $t_1$, because the term G2DC enables the "and" gate 70 in FIGURE 2. This results in a feedback voltage of −24 units. This, in turn, produces a negative input unit to the comparator amplifier 18, making the comparator amplifier output term A true. The term A is true therefore at G3DC sequence control gate time, so that the digitize flip-flop Q2 is set false. This is because the "and" gate 80 associated with the false input terminal of the digitize flip-flop Q2 in FIGURE 2 is enabled by the term G3DCA.

To reiterate, it was seen that the setting of the most significant digit flip-flop Q1 true in the example under consideration resulted in an input to the comparator amplifier 18 which made the term A false. This meant that the −16 units which resulted when the flip-flop Q1 was set true was less than the analog input voltage ($V_{IN}$). The digitizing flip-flop Q1, representing the most significant digit, was therefore left in its true state. When the digitizing flip-flop Q2 was also set true, however, the combined feedback reference voltage ($V_{FB}$) was greater than the analog input voltage ($V_{IN}$) resulting in the term A being made true. This resulted in the flip-flop Q2 being reset false.

The remainder of the conversion process continues in the same manner, resulting finally in the digitizing flip-flops being set either true or false, depending upon the results of each individual trial.

At the end of the digitizing process, the decomplement flip-flop N is set true by the term G6T. The resulting N term is "anded" with the P term in the inputs to the Q flip-flops. This is in order to provide a gating level to decomplement all the Q flip-flops in the event that the analog input voltage ($V_{IN}O$) is negative, as represented by the true state of the polarity flip-flop P.

The reasons for the above conditions can be more clearly illustrated by assuming a negative input of −19 units, and by following the digitizing process as described above. The result of the assumed negative input is simply that all the digitizing flip-flops end up in the opposite state to the actual digital equivalent of the negative analog input. In other words, the register formed by the digitizing flip-flops contains the complement of the digital equivalent, and they, therefore, must be decomplemented before read-out can take place, unless the associated digital handling equipment requires the negative numbers be represented in complemented form.

When the digitizing process is complete, and if necessary, when the digitizing flip-flops have been decomplemented, the digitize enable flip-flop D is set false. This is achieved by the sequence control gate G7DC which enables the "and" gate 54 (FIGURE 3) at the end of the digitizing interval.

Immediately following the conversion process, it is usually necessary to transfer the digital result to an external device, such as an associated digital computer or high speed printer. The usual requirement that exists is that the data must be read-out at a rate determined by the external device, rather than by the converter itself. It is for that reason that the logic of the converter system is arranged so that it can respond to different clock pulses $t_2$ from the associated equipment during the read-out operation. During the read-out operation, this external clock pulses $t_2$ are used, as mentioned above, to clock the digitizing flip-flops Q1–Q10, as well as the P flip-flop.

In addition to the external read-out clock pulses ($t_2$) the external read-out enable signal E (FIGURE 6) is used to enable the polarity flip-flop (P) and the digitizing flip-flops (Q1–Q10) for read-out, so that the binary number contained in these flip-flops can be shifted out to the external device in accordance with usual shift logic techniques. To prevent erroneous actuation of these flip-flops during the read-out operation, the sequence control gates G1–G7 are "anded" with the term D from the digitize enable flip-flop D, as described. This assures that the sequence control gates will be introduced to the system only during the digitizing operations, and not during the read-out operation. It is also desirable to "and" gate sequence control gates with the term C from the free running multivibrator, as described, so as to assure that these gates will occur midway between successive ones of the converter clock pulses $t_1$ for proper clock pulse control. The sequence control gates G1DC–G7DC illustrated in the curves of FIGURE 6 are the result of such an "anding" operation, as indicated in the curves.

In the read-out operation, and in accordance with the usual shift logic techniques, the successive external clock pulses $t_2$ will cause a zero to be shifted into the P flip-flop, and the P reading to be shifted into the most significant digit flip-flop Q1, the reading of Q1 to be shifted into the flip-flop Q2, and so on. Therefore, the flip-flop Q5 in FIGURE 2, representing in that instance the least significant digit flip-flop, will shift its reading into the external device. The read-out operation continues in this manner until all the flip-flops are set to zero, and the readings previously held in the flip-flops are shifted in a serial manner to the external device.

The invention provides, therefore, an improved analog voltage-to-digital converter system. The improved system of the present invention is advantageous in that it operates with a high degree of precision in the conversion of analog input voltage into corresponding multi-digital numbers. This high degree of precision is achieved, for example, by the use of an alternating current comparator amplifier operating in conjunction with an appropriate limiter and chopper, the output from the amplifier indicating the algebraic sum of the input and feedback voltages with a high degree of precision.

The improved conversion system of the present invention is also advantageous in that it responds to positive or negative analog input voltages, and automatically provides the proper conversion for the input, regardless of whether it is positive or negative, and also provides an appropriate sign digit indicating whether the input is positive or negative.

While a particular embodiment of the invention has been described, it is evident that modifications may be made. The following claims are intended to cover all such modifications as fall within the scope of the invention.

What is claimed is:

1. An analog-to-digital converter system for converting an analog input voltage into a corresponding multi-digital output signal, said system including: a register having a plurality of flip-flops respectively corresponding to the different digits of the digital output signal, feedback circuit means coupled to said register for providing a feedback reference voltage corresponding to the setting of said flip-flops at any particular instant, input circuit means to which an analog input voltage may be applied, summing circuit means coupled to said feedback circuit means and to said input circuit means for producing a control signal representative of the difference between said input voltage and said feedback voltage, means coupled to said summing circuit means for converting the control signal from said summing circuit means into a pulsating signal, alternating current amplifier means coupled to said converting means for amplifying the pulsating signal, and logic control means coupled to said alternating current amplifier means and to said register and responsive to the output signal from said alternating current amplifier means for controlling the setting of said flip-flops.

2. The system of claim 1 and which includes an amplitude limiter means coupled to said converting means for limiting the amplitude of the signal fed to said alternating current amplifier.

3. An analog-to-digital converter system for converting an analog input voltage into a corresponding multi-digital output signal, said system including: a register having a plurality of flip-flops respectively corresponding to the different digits of the digital output signal, feedback circuit means coupled to said register for producing a feedback reference voltage corresponding to the setting of said flip-flops at any particular instant, input circuit means to which an analog input voltage may be applied, summing circuit means coupled to said feedback circuit means and to said input circuit means for producing a control voltage representative of the difference between said input voltage and said feedback voltage, amplitude limiting means coupled to said summing circuit means for amplitude limiting the control voltage therefrom, chopper means coupled to said amplitude limiting means for converting the amplitude-limited control voltage therefrom into a pulsating voltage, alternating current amplifier means coupled to said chopper means for amplifying the pulsating voltage, and logic control means coupled to said alternating current amplifier means and to said register and responsive to the output voltage from said alternating current amplifier for controlling the setting of said flip-flops so as to reduce the value of said output voltage towards zero.

4. The converter system defined in claim 3, in which said chopper means comprises a transistor circuit including a pair of transistors of opposite conductivity characteristics and each having a collector electrode connected to a point of reference potential, an emitter electrode connected to a common input resistance means, and a base electrode, and circuit means for introducing complementary keying signals to the base electrodes of said transistors.

5. Transistorized chopper circuit including a pair of transistors of opposite conductivity characteristics and each having a collector electrode connected to a point of reference potential, an emitter electrode connected to a common input resistance means, and a base electrode, and circuit means for introducing complementary keying signals to the base electrodes of said transistors.

6. The chopper circuit defined in claim 5 and in which said circuit means includes series resistance means coupled to respective ones of said base electrodes, and respective trimmer capacitor means shunting said last-named resistance means.

7. The chopper circuit defined in claim 5 and which includes a pair of diodes respectively connected between said base and collector electrodes of said transistors.

8. In an analog-to-digital converter system for converting an analog input voltage into a corresponding multi-digital output signal, said system including: a register having a plurality of digitizing flip-flops, feedback circuit means coupled to said register for producing a feedback reference voltage corresponding to the settings of the digitizing flip-flops, input circuit means to which an analog input voltage may be applied, summing circuit means coupled to said feedback circuit means and to said input circuit means for producing a control voltage representative of the difference between said input voltage and said feedback voltage, said summing circuit means including a plurality of precision resistance elements, and a corresponding plurality of switching circuits connected to respective ones of said precision resistance elements and to corresponding ones of said digitizing flip-flops to connect said precision resistance elements selectively into said summing circuit when said flip-flops are actuated from one state to the other, each of said switching circuits includes a pair of switching devices, means for connecting said switching devices to a precision voltage source, one of said switching devices being connected to a corresponding one of said precision resistance elements, a balancing resistance element having a value corresponding to the value of the corresponding one of said precision resistance elements and connected to a point of reference potential and to the other of said switching devices, and input circuit means connected to a corresponding one of said digitizing flip-flops and to said switching devices to derive complementary output signals from said flip-flop so as to render said switching devices conductive and non-conductive in an alternate relationship.

9. The system defined in claim 8 in which said pair of switching devices are a pair of transistors.

10. The system defined in claim 9 in which said transistors have collector electrodes connected to said precision voltage source, emitter electrodes respectively connected to said balancing resistance element and to the corresponding one of said precision resistance elements, and base electrodes connected to said input circuit means.

11. The system defined in claim 9 in which at least one of said switching circuits includes voltage divider resistance means connected to said one of said transistors, a further transistor connected to said voltage divider resistance means for selectively connecting said voltage divider resistance means across said precision voltage source in conjunction with said one of said first-mentioned pair of transistors, said corresponding one of said precision resistance elements being connected to an intermediate point on said voltage divider resistance means.

12. In an analog-to-digital converter system for converting an analog input voltage into a corresponding multi-digit output signal, said system including: a register having a plurality of digitizing flip-flops, feedback circuit means coupled to said register for producing a feedback reference voltage corresponding to the settings of said digitizing flip-flops at any particular instant, input circuit means to which an analog input voltage may be applied, summing circuit means coupled to said feedback circuit means and to said input circuit means for producing a control voltage representative of the difference between said input voltage and said feedback voltage, timing circuit means for producing during each conversion operation a plurality of sequence control gate signals respectively corresponding to successive digit times therein, said timing circuit means including a plurality of transistors including respective time constant input circuits respectively coupled to respective ones of said digitizing flip-flops to derive current pulses therefrom as said digitizing flip-flops are triggered from one state to another, and logic circuitry coupled to said timing circuit means for successively setting the digitizing flip-flops to a particular state at successive digit times.

13. The converter system defined in claim 12 in which said summing circuit means includes a plurality of precision resistance elements, and a corresponding plurality of switching circuits connected to respective ones of said precision resistance elements and to corresponding ones of said digitizing flip-flops to connect said precision resistance elements selectively into said summing circuit when said flip-flops are actuated from one state to another, and in which at least one of said switching circuits includes a pair of transistors, means for connecting said transistors to a precision voltage source, means for connecting one of said transistors of said pair to a corresponding one of said precision resistance elements, a balancing resistance element having a value corresponding to the value of the corresponding one of said precision resistance elements and connected to a point of reference potential and to the other of said transistors, and input circuit means connected to a corresponding one of said digitizing flip-flops and to said transistors to derive complementary output signals from said flip-flops so as to render said transistors conductive and non-conductive in an alternate relationship.

14. The system defined in claim 13 in which at least one of said switching circuits includes voltage divider resistance means connected to said one of said transistors, a further transistor connected to said voltage divider resistance means for selectively connecting said voltage divider resistance means across said precision voltage source in conjunction with said one of said first mentioned pairs of transistors, said corresponding one of said precision resistance elements being connected to an intermediate point on said voltage divider resistance means.

References Cited in the file of this patent

UNITED STATES PATENTS

| | | |
|---|---|---|
| 2,845,597 | Perkins | July 29, 1958 |
| 3,017,626 | Muller | Jan. 16, 1962 |
| 3,089,097 | Bell | May 7, 1963 |

OTHER REFERENCES

IBM Technical Disclosure Bulletin, Analog-Digital, Digital-Analog Sign Handling, vol. 2, November 4–December 1959 (pp. 137–138).